(12) United States Patent
Gilbreath

(10) Patent No.: US 12,037,261 B2
(45) Date of Patent: Jul. 16, 2024

(54) MULTI-CONFIGURATION WATER PURIFICATION SYSTEM AND METHOD

(71) Applicant: SHTFandGo LLC, Burlington, WI (US)

(72) Inventor: Richard Gilbreath, Burlington, WI (US)

(73) Assignee: SHTFandGo LLC, Burlington, WI (US)

( * ) Notice: Subject to any disclaimer, the term of this patent is extended or adjusted under 35 U.S.C. 154(b) by 906 days.

(21) Appl. No.: 15/814,085

(22) Filed: Nov. 15, 2017

(65) Prior Publication Data
US 2018/0141825 A1    May 24, 2018

Related U.S. Application Data

(60) Provisional application No. 62/426,190, filed on Nov. 23, 2016.

(51) Int. Cl.
*C02F 1/00* (2023.01)
*B01D 5/00* (2006.01)
(Continued)

(52) U.S. Cl.
CPC .............. *C02F 1/002* (2013.01); *B01D 5/006* (2013.01); *B01D 24/48* (2013.01); *B01D 29/58* (2013.01);
(Continued)

(58) Field of Classification Search
CPC .... C02F 1/002; C02F 1/048; C02F 2201/005; C02F 1/001; C02F 1/18; C02F 1/04; C02F 1/12; C02F 1/28; C02F 1/42; C02F 1/44; C02F 1/505; C02F 2209/40; C02F 2307/10; C02F 11/122; C02F 2201/007; C02F 2201/008; C02F 9/005; C02F 1/02; C02F 9/00; C02F 1/003; C02F 2307/02; C02F 1/30; C02F 1/32; C02F 1/444; C02F 1/725; C02F 2303/04; C02F 2305/10; C02F 1/283; C02F 2001/427; C02F 2201/009;
(Continued)

(56) References Cited

U.S. PATENT DOCUMENTS

| | | | | |
|---|---|---|---|---|
| 5,744,037 A | * | 4/1998 | Fujimura | C02F 3/28 |
| | | | | 210/903 |
| 2004/0055301 A1 | * | 3/2004 | Johnston | F24S 23/30 |
| | | | | 60/641.8 |

(Continued)

OTHER PUBLICATIONS

Brandt, Presta vs Schrader Valves, Feb. 21, 2002, p. 1 (Year: 2002).*
(Continued)

*Primary Examiner* — Dirk R Bass
(74) *Attorney, Agent, or Firm* — Foley & Lardner LLP

(57) ABSTRACT

A water purification kit/system comprises a first pot, a second pot, a filter, and a condensation collector. The first pot and the second pot are configurable into first and second configurations, wherein, in the first and second configurations, the first pot is either an upper pot or a lower pot, and the second pot is the other of the upper pot and the lower pot. In the first configuration, the upper pot and the lower pot form a water filtration system. In the second configuration, the upper pot and the lower pot form a water distillation system.

20 Claims, 3 Drawing Sheets

(51) Int. Cl.
*B01D 24/00* (2006.01)
*B01D 24/48* (2006.01)
*B01D 29/58* (2006.01)
*B01D 29/60* (2006.01)
*C02F 1/04* (2023.01)

(52) U.S. Cl.
CPC ........... *B01D 29/60* (2013.01); *B01D 29/605* (2013.01); *C02F 1/048* (2013.01); *C02F 2201/005* (2013.01)

(58) Field of Classification Search
CPC ...... B01D 23/26; B01D 29/58; B01D 29/605; B01D 5/006; B01D 15/10; B01D 1/0017; B01D 1/0047; B01D 1/0082; B01D 1/02; B01D 21/0012; B01D 21/307; B01D 29/00; B01D 29/60; B01D 3/001; B01D 3/02; B01D 3/10; B01D 5/0006; B01D 5/0066; B01D 2201/60; B01D 2201/605; B01D 25/00; B01D 25/127; B01D 25/164; B01D 29/03; B01D 29/35; B01D 29/661; B01D 29/72; B01D 29/822; B01D 29/824; B01D 29/96; B01D 61/00; B01D 61/18; B01D 35/00; B01D 5/009; B01D 47/00; B01D 61/08; B01D 35/02; B01D 35/30; B01D 65/022; B01D 65/08; B01D 24/48; A62C 13/64; A62C 35/023; A62C 37/46; B65D 21/0231; B65D 21/0233; B65D 77/06; B67D 2001/0828; F16K 11/056; F16K 17/1626; F16K 17/403; Y02A 20/00; Y02A 20/109; Y10S 159/01; Y10S 159/26; Y10S 203/11; Y10T 137/1647; Y10T 137/2688; Y10T 137/3584; Y10T 137/3724; Y10T 137/7062; B30B 9/045; B30B 9/06; B30B 9/22; B30B 9/225

See application file for complete search history.

(56) References Cited

U.S. PATENT DOCUMENTS

| | | | | |
|---|---|---|---|---|
| 2005/0205129 | A1* | 9/2005 | Karalis | A62C 35/023 137/68.13 |
| 2009/0314703 | A1* | 12/2009 | Beach | C02F 9/005 210/232 |
| 2012/0204973 | A1* | 8/2012 | Wang | F16K 11/056 137/382 |
| 2014/0216993 | A1* | 8/2014 | Pradeep | C02F 1/001 210/85 |
| 2015/0129411 | A1* | 5/2015 | Meder | C02F 1/18 202/190 |
| 2018/0280838 | A1* | 10/2018 | Johnson | B01D 21/307 |

OTHER PUBLICATIONS

Allergy & Air: Water Filters: The Many Ways to Purify Your Drinking Water; Feb. 22, 2016; p. 1-2 (Year: 2016).*
WaterKey; Steam Distilled Water Purifiers; Mar. 21, 2014; p. 1 (Year: 2014).*

* cited by examiner

MULTI-CONFIGURATION WATER PURIFICATION SYSTEM AND METHOD

CROSS-REFERENCE TO RELATED APPLICATION

This application claims priority to U.S. Provisional Patent Application No. 62/426,190 entitled "MULTI-CONFIGURATION WATER PURIFICATION SYSTEM AND METHOD," filed Nov. 23, 2016, and incorporated herein by reference in its entirety.

TECHNICAL FIELD

The present invention relates to water purification systems and methods.

BACKGROUND

Water is an essential element for sustaining human life. Typically, water for daily living may be obtained from indoor plumbing or other sources. In some situations, however, such sources of water are not available. For example, such sources may not be available to people who are located in remote areas, either permanently or on a temporary basis (e.g., when camping). As another example, such sources may not be available after the occurrence of a catastrophic event, such as a natural disaster. Accordingly, an ongoing need exists for systems that may be used to purify water when other sources of purified water are not available.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Below is a detailed description of various concepts related to, and implementations of, methods, apparatuses, and systems for purifying water. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
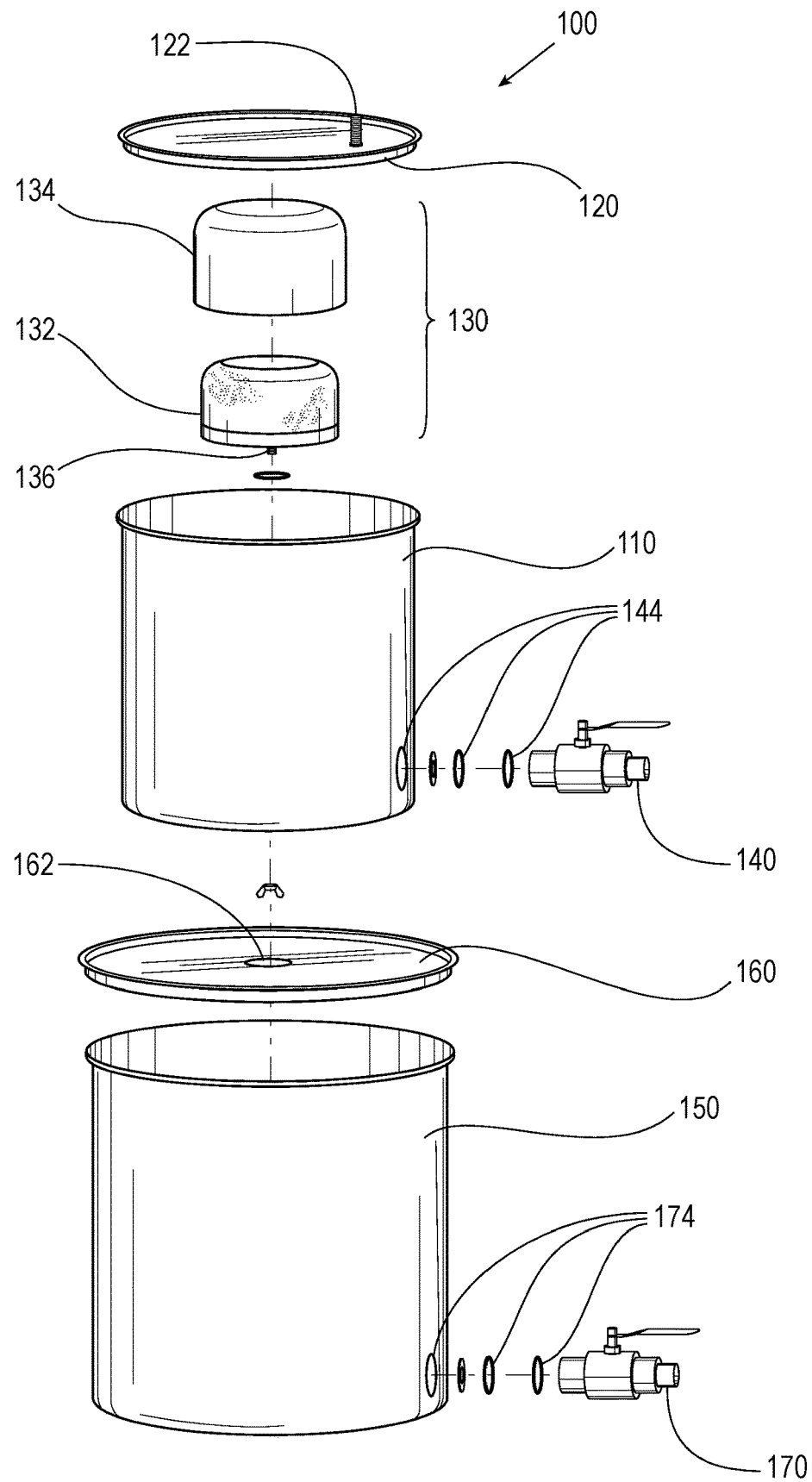
FIG. 1 is an exploded view of a water purification system in a first configuration in which the system operates as a water filtration system, according to an example embodiment.
Figure 2:
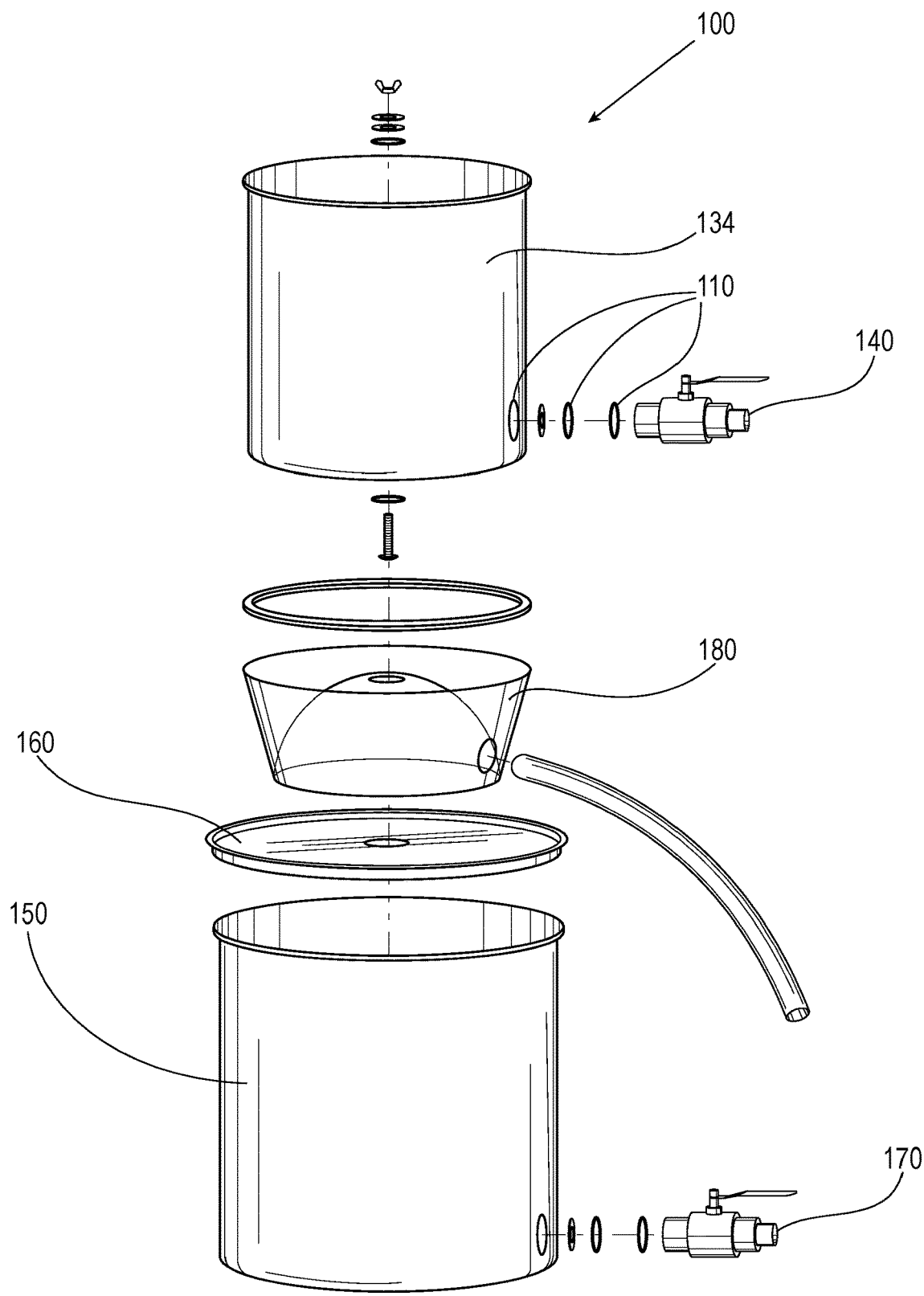
FIG. 2 is an exploded view of a water purification system in a second configuration in which the system operates as a water distillation system, according to an example embodiment.

Referring to FIGS. 1 and 2 generally, the various embodiments disclosed herein relate to systems and methods for water purification. The arrangement may be provided in the form of a kit that includes a first pot 110, a filter 130, a second pot 150 and a condensation collector 180. The various components of the kit may be configured according to different arrangements in order to implement different types of water purification systems. For example, in a first configuration, the first pot 110, the filter 130, and the second pot 150 may be configured as a water filtration system. (The condensation collector 180 need not be used in the first configuration.) In a second configuration, the first pot 110, the second pot 150, and the condensation collector 180 may be configured as a water distillation system. (The filter 130 need not be used in the second configuration.)

Generally, in the various configurations, one of the pots 110, 150 serves as an upper pot and the other of the pots 110, 150 serves as a lower pot. "Upper" and "lower" in the present context refers to the vertical positioning of the first and second pots relative to each other during operation of the water purification system (e.g., as a filtration system, as a distillation system, etc.). In the embodiment illustrated in FIGS. 1 and 2, the same pot (i.e., pot 110) serves as the upper pot in both configurations, and the other pot (i.e., pot 150) serves as the lower pot in both configurations. As will be appreciated, however, in other embodiments, the arrangement of the pots may be switched (e.g., one pot may serve as the upper pot in one configuration and as the lower pot in the other configuration). Although two pots are shown, it will be appreciated that additional pots and/or other components may also be employed. For purposes of simplicity in discussing FIGS. 1 and 2, pot 110 is hereinafter referred to as the "upper" pot and pot 150 is hereinafter referred to as the "lower" pot, it being understood that other arrangements are possible.

Referring now specifically to FIG. 1, FIG. 1 shows the upper pot 110, the filter 130, and the lower pot 150 configured as a water filtration system. In the arrangement of FIG. 1, unfiltered water is poured into the upper pot 110. The water flows from the upper pot 110, through the filter 130, and into the lower pot 150. The water is converted to filtered water upon flowing through the filter 130. The lower pot 150 at least temporarily collects the filtered water. In some embodiments, a valve 170 is provided that allows for the filtered water to be dispensed from the lower pot 150 into another container.

The filter 130 operates as a gravity filter. Hence, in the assembled state, the filter 130 is mounted at the bottom of the upper pot 110. The filter 130 includes a stem 136 that extends through a drain hole (not shown in FIG. 1) in the bottom of the upper pot 110. The filter 130 thus separates the drain hole from the remainder of the volume of the upper pot 110. By force of gravity, water in the upper pot 110 is pulled through the filter 130 and drains into the lower pot 150.

In one embodiment, the filter 130 comprises multiple filter subcomponents 132, 134. Subcomponent 132 may be a 0.2 micron silver-impregnated ceramic filter and subcomponent 134 may be a 10 micron sock filter that fits over the ceramic filter 132. In operation, the filter 134 performs a pre-filtering operation to remove larger contaminants, whereas the filter 132 removes remaining impurities.

In one embodiment, valves 140, 170 may be provided for the pots 110, 150, respectively. The valves 140, 170 may be mounted to the pots using appropriate mounting hardware 144, 174 (e.g., locknuts, gaskets, etc.).

In one embodiment, lids 120, 160 are provided for the upper and lower pots 110, 150, respectively. The lid 160 for the lower pot 150 may include a hole 162 for the stem 136 of the ceramic filter 132 to pass through. In one embodiment (as shown in the Appendices), latches may further be provided to lock the lids 120, 160 in place on the pots 110, 150. The locking lids 120, 160 seal the pots and prevent new contaminants (e.g., insects) from getting inside the pots 110, 150 (e.g., when the system is left outside overnight).

In one embodiment, an air valve 122 is provided which is mounted on the lid 120 on the upper pot 110. When the lid 120 is latched to the upper pot 110, an air tight seal is formed. The air valve 122 is configured to allow pressurized air to flow into the upper pot 110 when the air tight seal is formed to pressurize an interior of the upper pot 110. Pressurization of the interior of the upper pot 110 causes an increased rate of water flow through the filter 130 as compared to when the interior of the upper pot 110 is at ambient pressure. In one embodiment, in the water filtration configuration, filtered water may exit from the valve 170 at a rate of about one drip per second, or about a half gallon per hour when the upper pot 110 is not pressurized. By contrast, filtered water may exit from the valve 170 at a rate of four gallons per hour when the upper pot 110 is pressurized (e.g., at about 4 lbs of pressure).

In one embodiment, the air valve 122 is a conventional shrader valve having a standard-sized valve stem of approximately 8 millemeters in diameter. As is known, Schrader valves are used on virtually all automobile tires and motorcycle tires and most wider rimmed (non-racing) bicycle tires used in the world today. A Schrader valve is a pneumatic tire valve that consists of an externally threaded hollow cylindrical metal tube (valve stem), typically of brass. In the center of the exterior end is a metal pin (valve core) pointing along the axis of the tube; the pin's end is approximately flush with the end of the valve body. The valve core is a poppet valve assisted by a spring. Given that the air valve 122 is implemented in the form of a Schrader valve, the air valve 122 may be readily connected to readily available pressurization tools. Specifically, the air valve may be connected to a female fitting of a conventional tire pump, such as a bicycle tire pump. The air valve 122 may thus receive pressurized air from a conventional/standard bicycle tire pump to pressurize the interior of the upper pot 110.

Figure 3:
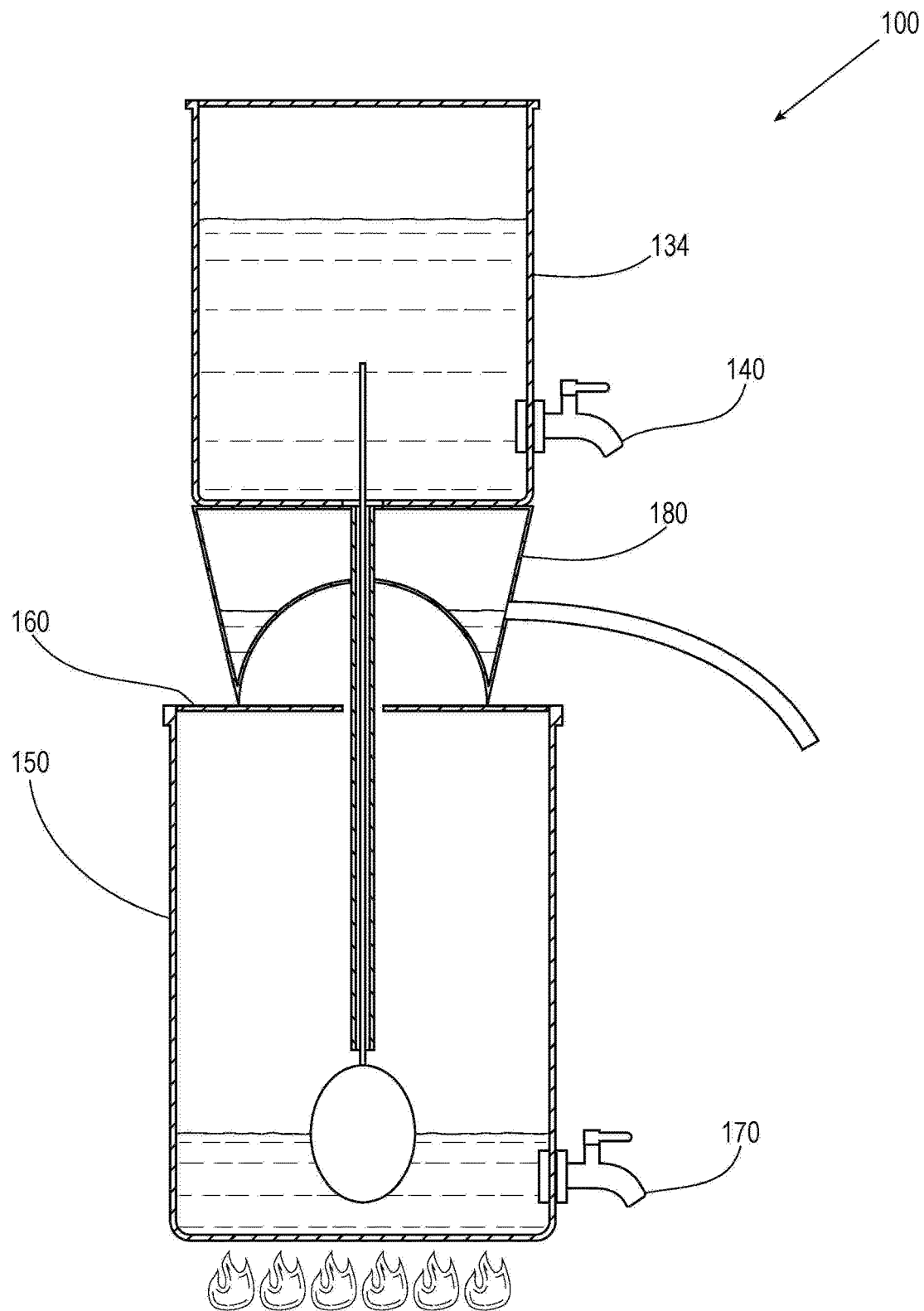
FIG. 3 is a schematic view of the water purification system in the second configuration in which the system operates as a water distillation system, according to an example embodiment.

Referring now specifically to FIGS. 2 and 3, in the second configuration, the upper pot 110 and the lower pot 150 form a water distillation system in which the upper pot 110 is configured to receive undistilled water, and the lower pot 150 is configured to receive thermal energy to heat undistilled water received from the upper pot 110 to a temperature above an evaporating point of the water, such that the undistilled water is converted to steam and thereafter collected by the condensation collector 180.

As shown in FIG. 2, in the second configuration, the condensation collector 180 (e.g., a plate) is disposed between the upper pot 110 and the lower pot 150. In operation, steam condenses on a bottom of the upper pot 110 and then the resultant condensation on the bottom of the upper pot 110 drips onto the condensation collector 180. The steam may also preheat the undistilled water in the upper pot 110. In some situations, the valve 140 may be used to drain heated water from the upper pot 110, such that the heated water may be replaced with cold water, thereby promoting condensation on the bottom of the upper pot 110.

In the second configuration, the arrangement may further comprise a valve configured to regulate a flow of undistilled water from the upper pot 110 to the lower pot 150. In one embodiment (as shown in the Appendices), the valve may include a copper float that is responsive to water level in the lower pot and that actuates the valve to regulate flow of water from upper pot 110 to lower pot 150 (shown schematically in FIG. 3). For example, the valve may comprise a rod and a feeder tub. The feeder tube may be fixedly mounted to the upper pot 110 and extend downwardly from the upper 110, through the hole 162, and into the lower pot 150. The rod may be fixedly mounted to the float. The rod and the float may move vertically responsive to the water level inside the lower pot 150. When the float is in a raised position, a water barrier provided on the rod prevents the flow of water through the feeder tube into the lower pot 150. The water barrier is pressed upwardly against the discharge outlet of the feeder tube, thereby blocking water from exiting the feeder tube.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for."

What is claimed is:
1. A water purification kit comprising:
a first pot;
a second pot;
a filter comprising at least one of a sock filter or a ceramic filter;
a condensation collector;
wherein the first pot and the second pot are configurable between a first configuration and a second configuration, wherein, in the first configuration and the second configuration, the first pot is either an upper pot or a lower pot, and the second pot is the other of the upper pot and the lower pot;
wherein, in the first configuration, the upper pot and the lower pot form a water filtration system in which water flows from the upper pot, through the filter, and into the lower pot, the water being converted to filtered water upon flowing through the filter, and wherein the lower pot at least temporarily collects the filtered water;
wherein, in the second configuration, the upper pot and the lower pot form a water distillation system in which the condensation collector is disposed between the upper pot and the lower pot such that the condensation collector is configured to collect condensation resulting from steam generated by the lower pot, the upper pot is fluidly coupled to the lower pot and is configured to receive a first amount of undistilled water, the lower pot is configured to receive a second amount of undistilled water from the upper pot, and the lower pot is configured to receive thermal energy to heat the second amount of undistilled water to a temperature above an evaporating point of the water, such that at least a portion of the second amount of undistilled water is converted to steam and thereafter collected by the condensation collector.

2. The kit according to claim 1, further comprising a lid and a latch mechanism, and wherein in the first configuration the latch mechanism locks the upper pot closed using the lid.

3. The kit according to claim 2, further comprising an air valve, the air valve being mounted on the lid or the upper pot, wherein when the lid is latched to the upper pot an air tight seal is formed, and wherein the air valve is configured to allow pressurized air to flow into the upper pot when the air tight seal is formed to pressurize an interior of the upper pot, wherein pressurization of the interior of the upper pot causes an increased rate of water flow through the filter relative to when the interior of the upper pot is at ambient pressure.

4. The kit according to claim 3, wherein the air valve is a pneumatic tire valve having a valve stem, wherein the valve stem has a diameter of approximately 8 millimeters, wherein the valve stem is configured to receive a female fitting of a bicycle tire pump to receive the pressurized air from the bicycle tire pump.

5. The kit according to claim 3, wherein the air valve is a Schrader valve.

6. The kit according to claim 3, wherein the air valve comprises a valve stem configured to receive a female fitting of a tire pump.

7. The kit according to claim 1, wherein the condensation collector is a collection plate, and wherein the collection plate is disposed between the upper pot and the lower pot in the second configuration.

8. The kit according to claim 7 wherein, in operation in the second configuration, the steam condenses on a bottom of the upper pot and preheats the undistilled water in the upper pot, and wherein condensation on the bottom of the upper pot drips onto the collection plate.

9. The kit according to claim 1, further comprising a valve configured to regulate a flow of undistilled water from the upper pot to the lower pot.

10. The kit according to claim 9, wherein the valve includes a float that is responsive to water level in the lower pot and that actuates the valve to regulate flow of water from the upper pot to the lower pot.

11. The kit according to claim 1, wherein the first pot is the upper pot in the first and second configurations and the second pot is the lower pot in the first and second configurations.

12. The kit according to claim 1, wherein the first pot is the upper pot in the first configuration and is the lower pot in the second configuration, and wherein the second pot is the lower pot in the first configuration and is the upper pot in the second configuration.

13. The kit according to claim 1, wherein water purification occurs at a rate of less than 20 gallons per hour.

14. The kit according to claim 1, wherein water purification occurs at a rate of less than 10 gallons per hour.

15. The kit according to claim 1, wherein water purification occurs at a rate of less than 5 gallons per hour.

16. A multi-configuration water purification system comprising:
   a first pot;
   a second pot;
   a filter having multiple filter subcomponents of different micron pore sizes;
   a condensation collector;
   wherein the first pot and the second pot are configurable between a first configuration and a second configuration, wherein, in the first configuration and the second configuration, the first pot is either an upper pot or a lower pot, and the second pot is the other of the upper pot and the lower pot;
   wherein, in the first configuration, the upper pot and the lower pot form a water filtration system in which water flows from the upper pot, through the filter, and into the lower pot, the water being converted to filtered water upon flowing through the filter, and wherein the lower pot at least temporarily collects the filtered water;
   wherein, in the second configuration, the upper pot and the lower pot form a water distillation system in which the condensation collector is disposed between the upper pot and the lower pot such that the condensation collector is configured to collect condensation resulting from steam generated by the lower pot, the upper pot is fluidly coupled to the lower pot and is configured to receive a first amount of undistilled water, the lower pot is configured to receive a second amount of undistilled water from the upper pot, and the lower pot is configured to receive thermal energy to heat the second amount of undistilled water to a temperature above an evaporating point of the water, such that at least a portion of the second amount of undistilled water is converted to steam and thereafter collected by the condensation collector.

17. The multi-configuration water purification system of claim 16, further comprising a lid and a latch mechanism, and wherein in the first configuration the latch mechanism locks the upper pot closed using the lid.

18. The multi-configuration water purification system of claim 17, further comprising an air valve, the air valve being mounted on the lid or the upper pot, wherein when the lid is latched to the upper pot an air tight seal is formed, and wherein the air valve is configured to allow pressurized air to flow into the upper pot when the air tight seal is formed to pressurize an interior of the upper pot, wherein pressurization of the interior of the upper pot causes an increased rate of water flow through the filter relative to when the interior of the upper pot is at ambient pressure.

19. The multi-configuration water purification system of claim 18, wherein the air valve is a pneumatic tire valve having a valve stem, wherein the valve stem has a diameter of approximately 8 millimeters, wherein the valve stem is configured to receive a female fitting of a bicycle tire pump to receive the pressurized air from the bicycle tire pump.

20. The multi-configuration water purification system of claim 16, wherein water purification occurs at a rate of less than 20 gallons per hour.

* * * * *